United States Patent [19]

Caronna

[11] Patent Number: 4,953,024
[45] Date of Patent: Aug. 28, 1990

[54] A PREDICTIVE PICTURE ENCODING CIRCUIT WHICH SELECTIVELY SUPPRESSES AND REPLACES PREDICTION ERROR VALVES, AND A CORRESPONDING PREDICTIVE DECODING CIRCUIT

[75] Inventor: Gaetano Caronna, Geldrop, Netherlands

[73] Assignee: U.S. Philips Corp., New York, N.Y.

[21] Appl. No.: 347,314

[22] Filed: May 3, 1989

[30] Foreign Application Priority Data

Dec. 23, 1988 [NL] Netherlands .......................... 8803152

[51] Int. Cl.⁵ .............................................. H04N 7/12
[52] U.S. Cl. ..................................... 358/136; 358/135
[58] Field of Search ............... 358/136, 135, 133, 105; 325/122, 26

[56] References Cited

U.S. PATENT DOCUMENTS 3,824,590 7/1974 Limb .
4,179,710 12/1979 Ishiguro et al. ...................... 358/135
4,232,338 11/1980 Netravali et al. .................... 358/136

FOREIGN PATENT DOCUMENTS 2703854 8/1978 Fed. Rep. of Germany .

OTHER PUBLICATIONS

"Digital Image Processing"; Pratt; A Wiley Interscience Publication, John Wiley and Sons; 1978; pp. 637-648.

"Adaptive Quantization of Picture Signals Using Spatial Masking"; Netravali et al., IEEE Proceedings, vol. 65 #4; 4-'77; pp. 536-548.

Primary Examiner—James J. Groody
Assistant Examiner—Victor R. Kostak
Attorney, Agent, or Firm—Emmanuel J. Lobato; Michael E. Marion

[57] ABSTRACT

In a predictive encoding circuit the transmission of prediction errors to the predictive decoding circuit is selectively suppressed and prediction errors having a predetermined value are applied to the prediction circuit in both the encoding circuit and in the decoding circuit, instead of the non-transmitted prediction errors. In order to determine which prediction errors are not transmitted, a masking function value is determined for an actual pixel in the encoding circuit. This is a linear combination of weighted difference between two pixel values of a predetermined cluster of pixels located in the vicinity of the actual pixel. The actual prediction error is not transmitted only if, for example this masking function value is within a certain range and the previous prediction error has been transmitted. In the decoding circuit the masking function values are determined, starting from the regained local pixel values.

12 Claims, 2 Drawing Sheets

FIG. 4A
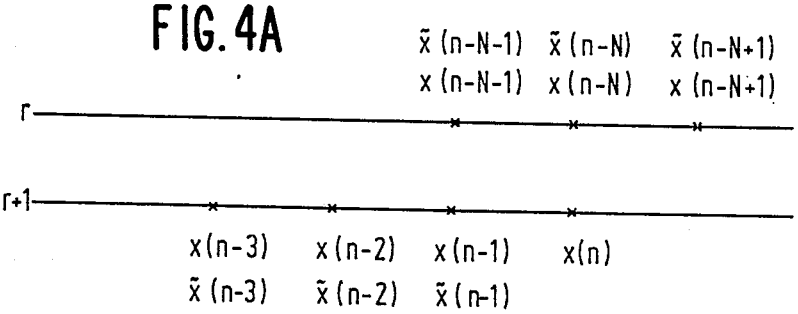
$$M(n) = 0.125 * |\tilde{x}(n-3) - \tilde{x}(n-2)| + 0.250 * |\tilde{x}(n-2) - \tilde{x}(n-1)| +$$
$$+ 0.250 * |\tilde{x}(n-N-1) - x(n-1)| + 0.250 * |\tilde{x}(n-N) - \tilde{x}(n-N-1)| +$$
$$+ 0.125 * |\tilde{x}(n-N+1) - \tilde{x}(n-N)|$$
FIG. 4B
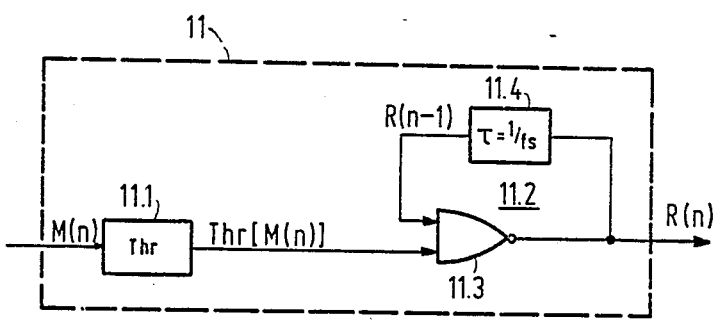
FIG. 5

A PREDICTIVE PICTURE ENCODING CIRCUIT WHICH SELECTIVELY SUPPRESSES AND REPLACES PREDICTION ERROR VALVES, AND A CORRESPONDING PREDICTIVE DECODING CIRCUIT

A. BACKGROUND OF THE INVENTION

The invention generally relates to a predictive encoding circuit for encoding pixel values of pictures composed of pixels, and to a predictive decoding circuit for converting the pixel values thus encoded into the original pixel values.

Circuits of this type may form part of a television broadcasting system, in which case the encoding circuit forms part of the broadcasting transmitter and each TV receiver is provided with a decoding circuit. Encoding and decoding circuits combined may also form part of a video recorder or any other storage system such as a still picture video camera and the associated display module.

B. DESCRIPTION OF THE PRIOR ART

For transmitting a picture or image electrically, such a picture or image is generally partitioned into pixels each with its own color and may thus be considered to be a matrix. For example, such a matrix comprises $M_1$ rows of pixels, each row comprising $M_2$ pixels.

As is known, a color is obtained by a linear combination of three so-called component signals such as Y, U, V or R, G, B. The following applies to each individual component signal. The value of a given component signal for a given pixel will be referred to as pixel value. A number is assigned to each pixel during digitization. This number may indicate the pixel value itself or, for example the difference between the pixel values of two contiguous pixels. In the first case this is sometimes referred to as a digital picture in a canonical form, or shortly a canonical picture.

For realizing a high resolution picture it is today a more common practice to compose a picture or image from a matrix of approximately 1200 rows ($M_1=1200$) with approximately 1400 pixels each ($M_2=1400$). If the pixel value considered for each pixel is represented by 8 bits, more than $10^7$ bits are required for the representation of the canonical picture. This is found to be inadmissibly high in practice. The object of the encoding circuit is to convert the canonical picture into a non-canonical picture which can be represented with a considerably smaller number of bits.

Different methods are known for the said conversion of the canonical picture into a non-canonical picture. The present invention more particularly relates to the method which is known as predictive encoding. As is generally known, see for example pp. 637-648 of Reference 1, the pixel values of the canonical picture are applied one after the other and row by row to a difference producer in which each pixel value is reduced by a so-called prediction value and the prediction error thus obtained is quantized. On the one hand the quantized prediction errors are transmitted and on the other hand they are applied to a prediction circuit which calculates the prediction value for the next picture element. In the case of uniform quantization the quantization levels are at an equal distance from one another, which distance is taken to be small so as to keep the quantization noise as small as possible. If it can be assumed that the prediction errors never exceed a given threshold, the number of quantization levels can be limited. In practice it appears that eight quantization levels are usually sufficient so that no more than three bits are required to represent such a quantization level and hence the prediction error. In practice the said assumption appears to be incorrect. In fact, large variations due to contours in the picture may occur in such signals. Extreme variations occur, for example in the case of a dark (black) area on a light (white) background. If it is desired to accurately encode such signals with a low number of bits per pixel, adaptive quantization may be used. This may be realised in different manners. In the first place, a quantization characteristic can be chosen with which the quantization levels are no longer at an equal distance from one another. For example, the distance between successive quantization levels increases with an increasing value of the signal to be quantized. In the second place, a choice may be made from a number of fixed quantization characteristics, the choice being determined by, for example local statistic properties of the original picture. Such an adaptive quantization is described, for example in Reference 2. More particularly a so-called masking function is calculated for each pixel and a signal is derived therefrom which determines which quantization characteristic must be used for the quantization of the actual prediction error. The masking function of an actual pixel is the weighted sum of differences of pixel values of pixels in the vicinity of the actual pixel. Dependent on the type of ambience, a distinction can be made between one-dimensional and two-dimensional masking functions. If the pixel value of the j-th pixel on the i-th line is denoted by $S_{ij}$ and its masking function is denoted by $M_{ij}$, and if the ambience of this pixel is limited to the k pixels preceding this pixel (i,j), it holds, for example that:

$$M_{i,j} = \sum_{n=j-k}^{j} \alpha_{i,n} (S_{i,n} - S_{i,n-1})$$

As is indicated in Reference 2, $\alpha_{i,n}$ is, for example dependent on the Euclidean distance between the pixels (i,j) and (i,n).

C. OBJECT OF THE INVENTION

With respect to other adaptive quantization methods, adaptive quantization under the control of the masking function realizes a further reduction of the correlation between the different pixels. By applying the quantized prediction errors thus obtained to an optimally dimensioned variable length encoder, this reduced correlation results in a lower bit rate at the output of the variable length encoder. For example, it appears that the luminance component Y for still pictures with many contours requires approximately 30% fewer bits and even approximately 40% fewer bits for still pictures with few contours. This quantization method appears to yield no improvement for the colour component signals U and V.

It is the object of the invention to realize a further reduction of the number of bits required to represent a picture or image without a noticeable deterioration of the picture quality.

D. SUMMARY OF THE INVENTION

According to the invention, the object described above is realized in that it is determined whether the masking function is located within a predetermined interval. If this is not the case, the prediction error is transmitted to the predictive decoding circuit. If this is the case, it is checked whether the previous prediction error has been transmitted. If this is the case, the actual prediction error is not transmitted. If this is not the case, the actual prediction error is transmitted if a given number of successive prediction errors for which the masking function was located within the interval has not been transmitted.

In the associated predictive decoding circuit these non-transmitted prediction errors are inserted in the form of prediction errors with a fixed value, for example the value zero, between the received prediction errors. To this end the masking function is also utilized which is now derived from the pixel values occurring at the output of the decoding circuit.

The invention will be appreciated if the reader realises that in the predictive encoding circuit described in Reference 2 each prediction error is in principle transmitted to the decoding station, although the quantization characteristic used for successive prediction errors may differ. In contrast with this, only one out of Q prediction errors is transmitted in the predictive encoding circuit according to the invention as long as the masking function is within fixed limits.

Experiments with different still pictures, in which the value of two was chosen for Q and the interval of the masking function ranged from zero to four, revealed that the total number of bits required for encoding still pictures could be further reduced by more than 20% without any noticeable deterioration of the picture quality, as compared with the encoding circuit described in Reference 2.

E. REFERENCES

1. Digital Image Processing; W. K. Pratt; A Wiley interscience publication, John Wiley and Sons 1978, pp. 637–648.

2. Adaptive Quantization of Picture Signals using Spatial Masking; A. N. Netravali, B. Prasada; Proceedings of the IEEE, Vol. 65, No. 4, Apr. 1977, pp. 536–548.

F. BRIEF DESCRIPTION OF THE FIGURES

FIG. 4(A) shows some rows of the matrix in which a picture or image is partitioned to explain the algorithm which is performed in the masking function circuit.

FIG. 4(B) describes the possible relationship between the auxiliary pixel values indicated in FIG. 4(A) and the masking function value M(n).

FIG. 5 shows an embodiment of an evaluation circuit for use in the predictive encoding and decoding circuit.

G. EXPLANATION OF THE INVENTION

G(1) An embodiment

Figure 1:
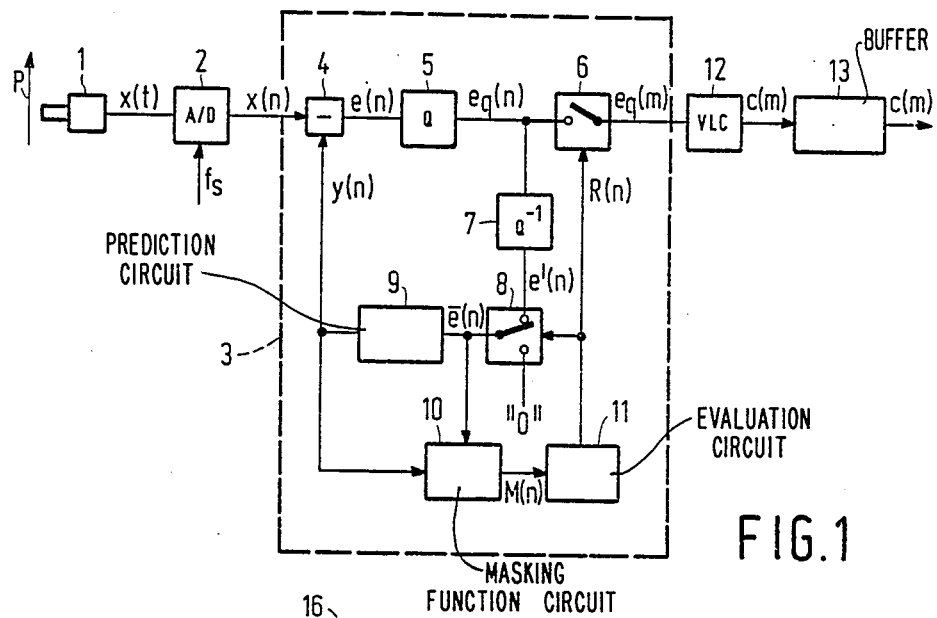
FIG. 1 shows a transmitter for use in a predictive encoding system and comprising a predictive encoding circuit according to the invention.

FIG. 1 shows an embodiment of a transmitter for use in a predictive encoding system. This transmitter comprises a TV camera 1 which converts an image P into an analog video signal x(t). This signal is converted in an analog-to-digital converter 2 into pixel values x(n). This analog-to-digital converter is controlled by sampling pulses which occur at a rate $f_s$. These pixel values x(n) constitute the digital representation of the image P and must be transmitted to a cooperating receiver.

To utilize the capacity of the transmission medium to an optimum extent, these pixel values are subjected to a source encoding. To this end they are applied to a predictive encoding circuit 3. This circuit comprises a difference producer 4 which receives the pixel values x(n) and a prediction value y(n) for each pixel value. It supplies prediction errors $e(n) = x(n) - y(n)$ which are converted in a quantizer 5 into quantized prediction errors $e_q(n)$. These errors are applied to a switching device 6, and which is only shown symbolically, which is controlled by a time-discrete control signal consisting of a series of bivalent control signal values R(n). This switching device 6 allows the quantized prediction error $e_q(n)$ applied thereto to pass if R(n) has the logic value "1" and it suppresses this quantized prediction error if R(n) has the logic value "0". Thus, a row of quantized prediction errors $e_q(m)$ occurring at irregular intervals is produced at the output of this switching device 6.

The quantized prediction errors $e_q(n)$ are not only applied to the switching device 6, but also to an inverse quantizing circuit 7. This circuit converts the quantized prediction errors $e_q(n)$ into auxiliary prediction errors e'(n) which correspond to the original prediction errors e(n). These auxiliary prediction errors e'(n) are applied to a switching device 8, which is only shown symbolically, and which also receives numbers of the value zero. This switching device 8 is also controlled by the time-discrete control signal R(n). More particularly, this switching device 8 allows the auxiliary prediction error e'(n) to pass if R(n) has the logic value "1" and allows the number zero instead of e'(n) to pass if R(n) has the logic value "0". Thus, a series of modified auxiliary prediction errors $\bar{e}(n)$ is produced at the output of the switching device 8. These errors are applied to a prediction circuit 9 which may have a known construction and which supplies the previously mentioned prediction values y(n).

Figure 3:
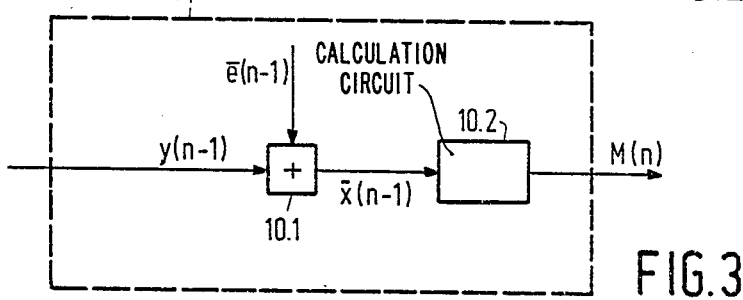
FIG. 3 shows a masking function circuit for use in the predictive encoding circuit and decoding circuit.

The prediction values y(n) and the modified auxiliary prediction values $\bar{e}(n)$ are applied to a masking function circuit 10 which calculates an associated masking function value M(n) for each pixel value x(n) in accordance with a predetermined algorithm. As is shown in FIG. 3, this circuit 10 includes an adder 10.1. To determine the masking function value M(n) associated with the next pixel value x(n), this adder 10.1 receives the prediction value y(n−1) and the modified auxiliary prediction error $\bar{e}(n-1)$. By adding these two values to each other, the auxiliary pixel value $\bar{x}(n-1)$ is obtained which in principle is equal to the pixel value x(n−1). The auxiliary pixel values $\bar{x}(n)$ are further applied to a calculation circuit 10.2 which calculates the associated masking function M(n) for each pixel value x(n) by making a linear combination of weighted differences between auxiliary pixel values $\bar{x}(n)$, for example in a manner as will be described in greater detail with reference to (FIGS. 4(A) and 4(B). FIG. 4(A) two successive rows of pixels of a picture. They are denoted by r and r+1, respectively. Crosses on these rows denote a number of successive pixels with the associated pixel values and the auxiliary pixel values. It is assumed that each row comprises N pixels. FIG. 4(B) describes a possible relationship between the auxiliary pixel values of the pixels indicated in FIG. 4(A) and the masking function value M(n) associated with the pixel with pixel value x(n). For performing this algorithm, the calculation circuit 10.2 may be constructed in a manner which does not principally deviate from the structure of a prediction circuit, like the prediction circuit 9 in FIG. 1.

The masking function values M(n) thus obtained are applied to an evaluation circuit 11 which determines a control signal value R(n) for each pixel value x(n). As is shown diagrammatically in FIG. 5, it is first checked whether the masking function value M(n) is within or outside a given interval. This is effected in an amplitude evaluation circuit 11.1 which converts each masking function value M(n) into an interval-indication value Thr[M(n)] having the logic value "1" or "0". If it is assumed that the said interval is bounded by the interval bounding values $Thr_0$ and $Thr_1$, it holds, for example that $$Thr[M(n)] = 1 \text{ for } Thr_0 \leq M(n) \leq Thr_1$$
$$= 0 \text{ for } Thr_0 > M(n) \text{ or } M(n) > Thr_1$$

This interval-indication value Thr[M(n)] is now applied to a logic circuit 11.2 which supplies the control signal values R(n) in such a way that these control signal values R(n) assume the logic values "0" and "1" in a predetermined alternation as long as the interval-indication value Thr[M(n)]=1 and which assume the logic value "1" whenever Thr[M(n)]=0. In the embodiment shown the logic circuit 11.2 is constituted by a NAND gate 11.3 and a delay line 11.4 which has a delay time of one sampling period performs a logic operation described by the expression $R(n) = Thr[M(n)] \cdot R(n-1)$. These elements are interconnected in the manner shown in the Figure. Due to this construction of the logic circuit the control signal values R(n) become 1 as long as Thr[M(n)]=0, which means that the quantized prediction errors $e_q(n)$ pass switching device 6 (see FIG. 1). As long as Thr[M(n)] is 1 the control signal values R(n) will be alternately "0" and "1", which means that the quantized prediction errors $e_q(n)$ alternately pass and do not pass the switching device 6.

For transmitting the quantized prediction errors $e_q(m)$ which have passed the switching device 6, they are first subjected in known manner to a variable length encoding in a variable length encoder 12 and the code words c(m) supplied thereby are temporarily stored in a buffer 13.

Figure 2:
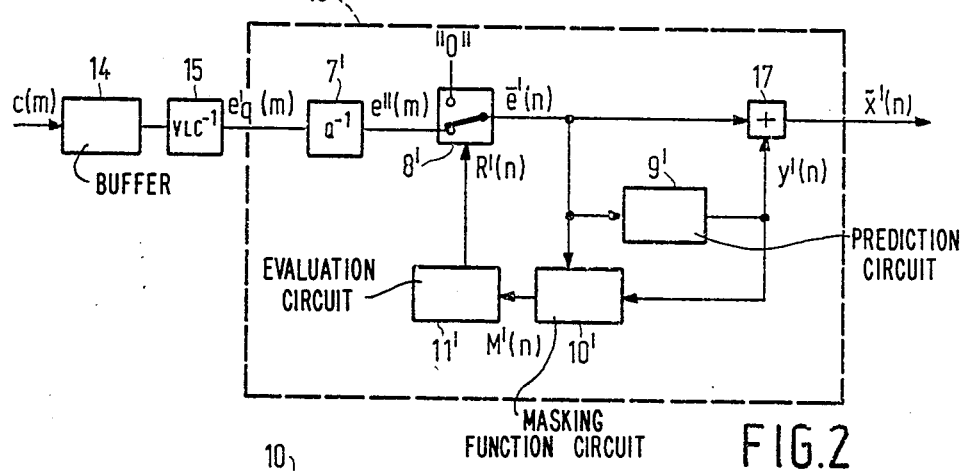
FIG. 2 shows a receiver for use in a predictive encoding system and comprising a predictive decoding circuit according to the invention.

The code words c(m) stored in the buffer 13 are transmitted at a constant bit rate to the receiver shown in FIG. 2. In this FIG. 2 elements corresponding to those in FIG. 1 are denoted by the same, but primed reference numerals. This receiver comprises an input buffer 14 which has a conventional structure and which receives the code words c(m) and applies these code words at irregular instants to a variable length decoder 15 whose function is inverse to that of the variable length encoder 12 in the transmitter. This decoder 15 thus supplies local prediction errors $e'_q(m)$ which are in principle equal to the original quantized prediction errors $e_q(m)$. They are applied in their turn to a predictive decoding circuit 16 which supplies local pixel values $\bar{x}(n)$ which are identical to the auxiliary pixel values $\bar{x}(n)$.

The predictive decoding circuit 16 comprises an inverse local quantizing circuit 7' which converts each local prediction error $e_q(m)$ into a local auxiliary prediction error e"(m). These local auxiliary prediction errors are applied to a switching device 8', which is also shown only symbolically, which also receives numbers of the value "0". This switching device 8' is controlled by a local time-discrete control signal comprising a series of bivalent local control signal values R'(n). More particularly, this switching device 8' each time passes the local auxiliary prediction error e'(m). In these cases it holds that R'(n)=1. It adds a number "0" between two successive local auxiliary prediction errors whenever R'(n)=0. Thus, a series of modified local auxiliary prediction errors $\bar{e}'(n)$ which is equal to the series of modified auxiliary prediction errors $\bar{e}(n)$ supplied by switching device 8 in the transmitter is produced at the output of this switching device 8'. This series is applied to a local prediction circuit 9' which supplies local prediction values y'(n) in response thereto, which values are in principle identical to the prediction values y(n).

The modified local auxiliary prediction errors $\bar{e}'(n)$ together with the local prediction values y'(n) are not only applied to the local prediction circuit 9' but also to a local masking function value M'(n) for each modified local auxiliary prediction error $\bar{e}'(n)$. This value is in turn applied to a local evaluation circuit 11' which determines a local control signal value R'(n) for each modified local auxiliary prediction error. This local masking function circuit 10' and the local evaluation circuit 11' may be constructed in the way as is shown in FIG. 3 and FIG. 5, respectively.

This decoding circuit also includes an adder circuit 17 which adds a modified local auxiliary prediction error $\bar{e}(n)$ to each local prediction value y'(n) and thus supplies the local pixel values x(n) which are in principle equal to the original pixel values x(n).

G(2) Further possible embodiments

In the embodiment shown in FIG. 1 each prediction error e(n) is quantized, independently of the decision of transmitting or not transmitting it to the receiver. However, switching device 6 may also be incorporated between the difference producer 4 and the quantizer 5.

To determine the masking function value M(n) weighting factors 0.125 and 0.250 have been used for the algorithm shown in FIGS. 4(A). 4(B). However, different weighting factors are alternatively possible. A different linear combination of (auxiliary) pixel values $\bar{x}(n)$ is also possible.

In the embodiment shown in FIG. 2 the masking function circuit 10' may be constituted in the manner as is shown in FIG. 3. However, since the pixel values x(n) occurring at the output of adder 10.1 (FIG. 3) are identical to the local pixel values $\bar{x}'(n)$ occurring at the output of adder 17 (FIG. 2), the last-mentioned pixel values can also be directly applied to circuit 10' and the adder 10.1 can be dispensed with.

I claim:
1. A predictive encoding circuit for pixel values of pixels jointly defining a picture, comprising:
 (a) an encoding circuit input for receiving pixel values and an encoding circuit output;
 (b) difference producer means receiving the pixel value of an actual pixel via a first input and an associated prediction value via a second input, and supplying a prediction error for said actual pixel at its output by difference production of the two values applied thereto;
 (c) a prediction circuit having an input and an output and supplying said prediction values at said output;

(d) a first coupling circuit for coupling the output of the difference producer means to the encoding circuit output;

(e) a second coupling circuit for coupling the output of the difference producer means to the input of the prediction circuit; characterized in that:

(f) the first coupling circuit comprises means which are controlled by control signal values for selectively suppressing prediction errors;

(g) the second coupling circuit comprises means for selectively replacing the prediction errors suppressed in the first coupling circuit with replacement prediction errors having a predetermined value and for providing said prediction errors and said replacement prediction errors as output prediction errors;

(h) a masking function circuit is provided for determining the masking function value for the actual pixel, which value is equal to the weighted sum of differences between two pixel values of a predetermined cluster of pixels located in the vicinity of the actual pixel;

(i) an evaluation circuit is provided which receives the masking function values and, in response thereto, determines the control signal value for the actual pixel.

2. A predictive encoding circuit as claimed in claim 1, wherein the evaluation circuit comprises an amplitude evaluation circuit which receives the masking function values and supplies a logic signal value of a first or a second type dependent on whether the actual masking function value lies within or outside a predetermined amplitude interval.

3. A predictive encoding circuit as claimed in claim 2, wherein the evaluation circuit also comprises a logic circuit which receives one of said logic signal values from the amplitude evaluation circuit and one of said control signal values for generating a further control signal value by means of a logic combination.

4. A predictive encoding circuit as claimed in claim 3, wherein the logic combination of said control signal value and further logic signal value is described by the logic expression:

$R(n) = Thr[M(n)] \cdot R(n-1)$, where n is an integer and in which R(n) represents said further control signal value;

R(n−1) represents the previous control signal value;

Thr[M(n)] represents the actual masking function value.

5. A predictive encoding circuit as claimed in claim 1, wherein said masking function circuit comprises an adding means coupled to said second coupling circuit, for summing said output prediction errors and said prediction values.

6. A predictive decoding circuit for decoding received prediction errors, comprising:

(a) a decoding circuit input for receiving the prediction errors and a decoding circuit output for supplying local pixel values of pixels jointly defining a picture;

(b) adding means which receives a prediction error for an actual pixel via a first input and an associated local prediction value via a second input and which supplies the local pixel value for the actual pixel at its output by summation of the two values applied thereto;

(c) a first coupling circuit for coupling the first input of the adding means to the decoding circuit input;

(d) a local prediction circuit having an input and an output and supplying the local prediction values at said output;

(e) a second coupling circuit for coupling the input of the local prediction circuit to the decoding circuit input; characterized in that:

(f) the first and the second coupling circuits each comprise means which are controlled by local control signal values for selectively adding prediction errors having a predetermined fixed value between received prediction errors;

(g) a local masking function circuit is provided to determine a local masking function value for an actual pixel, which value is equal to the weighted sum of differences between two local pixel values of a predetermined cluster of pixels located in the vicinity of the actual pixel;

(h) a local evaluation circuit is provided which receives said local masking function value and, in response thereto, supplies the local control signal value for the actual pixel.

7. A predictive decoding circuit as claimed in claim 6, wherein the local masking function circuit receives the local pixel values which occur at the output of the adding means.

8. A predictive decoding circuit as claimed in claim 6, wherein the local evaluation circuit comprises a local amplitude evaluation circuit which receives the local masking function values and supplies an logic signal value of a first or a second type dependent on the fact whether the actual local masking function value is within or outside a predetermined amplitude interval.

9. A predictive decoding circuit as claimed in claim 8, wherein the local evaluation circuit also comprises a logic circuit which receives one of said logic signal values from the local amplitude evaluation circuit and one of said local control signal values for generating a further control signal value by means of a logic combination.

10. A predictive decoding circuit as claimed in claim 9, wherein the logic combination of said control signal value and said logic signal value is described by the logic expression:

$R(n) = Thr[M(n)] \cdot R(n-1)$ where n is an integer and in which R(n) represents said further local control signal value;

R(n−1) represents the previous local control signal value;

Thr[M(n)] represents the actual local masking function value.

11. A predictive decoding circuit as claimed in claim 6, wherein each control signal value is equal to either a first or a second logic signal value.

12. A predictive decoding circuit as claimed in claim 11, wherein the logic combination of control signal values and logic signal values supplied by the local amplitude evaluation circuit is described by the logic expression:

$R(n) = Thr[M(n)] \cdot R(n-1)$ where n is an integer and in which R(n) represents said further local control signal value;

R(n−1) represents the previous local control signal value;

Thr[M(n)] represents the actual local masking function value.

* * * * *